Apr. 10, 1923.

W. G. CARTTER ET AL 1,451,671

ELECTRIC WATER HEATER

Filed Feb. 28, 1922

INVENTORS:
WILLIAM G. CARTTER
FULLER W. THOMPSON,
BY
Graham + Harris
ATTORNEYS.

Patented Apr. 10, 1923.

1,451,671

UNITED STATES PATENT OFFICE.

WILLIAM G. CARTTER, OF MONROVIA, AND FULLER W. THOMPSON, OF ARCADIA, CALIFORNIA.

ELECTRIC WATER HEATER.

Application filed February 28, 1922. Serial No. 539,851.

*To all whom it may concern:*

Be it known that we, WILLIAM G. CARTTER, a citizen of the United States, residing at Monrovia, in the county of Los Angeles and State of California, and FULLER W. THOMPSON, a citizen of the United States, residing at Arcadia, in the county of Los Angeles, State of California, have invented a new and useful Improvement in an Electric Water Heater, of which the following is a specification.

Our invention relates to water heaters and more particularly to heaters using an electric heating element as a source of energy. It is particularly adapted to the use of what is known as an immersion heater.

The principle object of the invention is to provide an electric water heater in which an immersion heater is used and which is so constructed that it is mechanically very strong and, at the same time, it is reasonable in cost.

Further objects and advantages will be made evident hereinafter from the following description and drawings.

Referring to the drawings, which are for illustrative purposes only,

Figure 1:
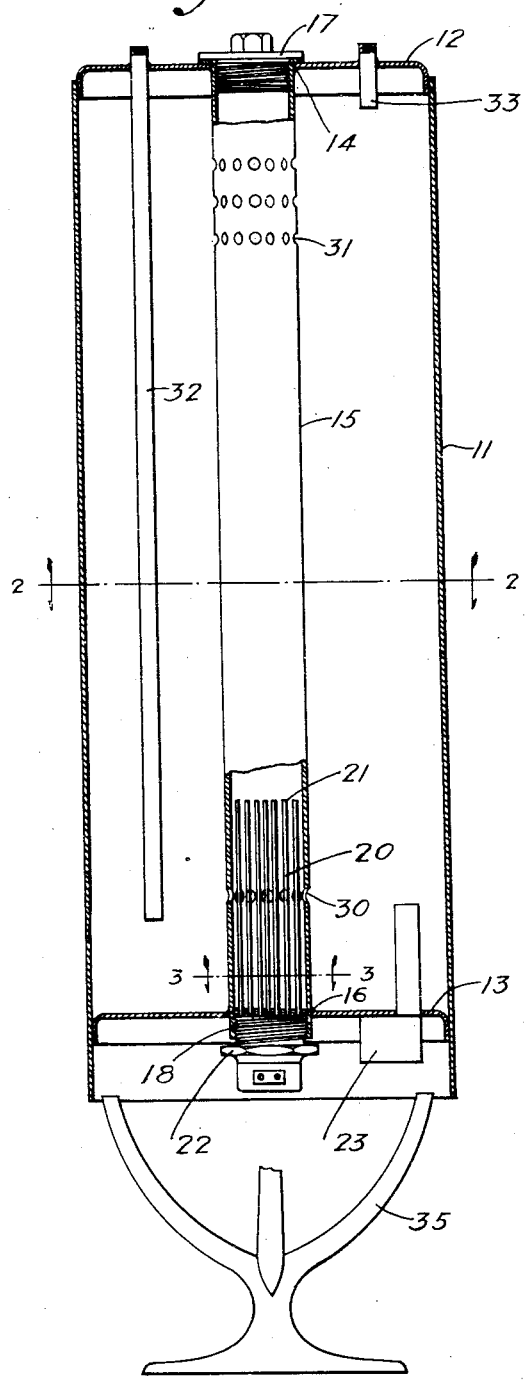
Fig. 1 is a side elevation illustrating a heater embodying our invention.
Figure 2:
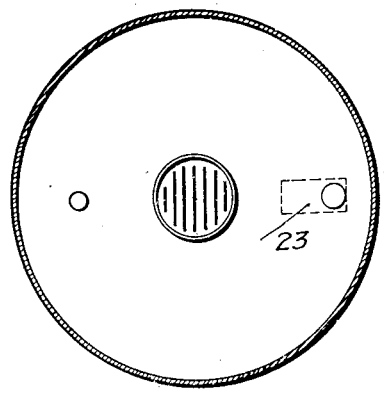
Fig. 2 is a section on a plane represented by the line 2—2 of Fig. 1, this plane being viewed in the direction of the arrows.
Figure 3:
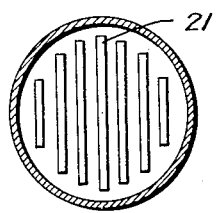
Fig. 3 is a view drawn to an enlarged scale on a plane represented by the line 3—3 of Fig. 1, this plane being viewed in the direction of the arrows.

In the form of the invention illustrated, we provide a shell 11 having a top 12 and a bottom 13, which are riveted and soldered, welded or otherwise secured in the shell 11.

Tightly secured in the center of the top 12 at a point 14 is a central tube 15 which is also tightly secured at 16 in the bottom 13. The tube 15 is preferably welded in the top 12 and the bottom 13, and when so secured it acts as a stay, preventing the bottom and top from being forced outwardly by internal pressure and greatly increasing the strength of the tank. The top of the tube 15 may be closed by a plug 17 and the bottom of this tube is threaded, as shown at 18, for the reception of an immersion heater 20.

These immersion heaters are old in the art and need not be specifically illustrated. They consist essentially of heating elements which are secured in flat metal envelopes which project upwardly from a threaded plug 22. The immersion heater 20 may be supplied with current through a switch not shown carried in a thermostat 23. This thermostat and switch form no part of our invention. The tube 15 is provided with inlet perforations 30 and outlet perforations 31. Cold water is delivered through a pipe 32 and hot water is removed through a pipe 33. The heater may be secured on a suitable stand 35.

The method of operation is as follows:

The tank formed of the shell 11 and the tops 12 and 13 being filled with water, the thermostat 23 closes the circuit to the immersion heater 20 which is energized by the electric current, heating the water with which the envelopes 21 are in contact. This hot water rises in the tube 15 and is delivered into the top of the tank through the openings 31, cold water entering the tube 15 through the openings 30. The hot water tends to remain in the top of the tank so that hot water may be withdrawn through the pipe 33 very soon after the current is applied to the heater.

By the peculiar arrangement illustrated, we are not only able to provide a heater having great mechanical strength due to the central tube 15, but we are able to provide a heater having an immersion heater in the bottom which will quickly deliver hot water to the top of the heater.

We claim as our invention:

1. In an electric water heater, the combination of: a cylindrical outer shell; a top secured in said shell; a bottom secured in said shell; a tube situated in said shell, the upper end of said tube being secured to said top and the lower end of said tube being secured to said bottom; and an electric heating element inserted in said tube, said tube being perforated to provide an open communication between the interior of said tube and the water space around said tube and inside said shell.

2. In an electric water heater, the combination of: a cylindrical outer shell; a top secured in said shell; a bottom secured in said shell; a tube situated in said shell, the upper end of said tube being secured to said top and the lower end of said tube being secured to said bottom; and an immersion electric heater in said tube, said tube being perforated to provide an open communication between the interior of said tube and the water space around said tube and inside said shell.

3. In an electric water heater, the combination of: a cylindrical outer shell; a top secured in said shell; a bottom secured in said shell; a tube situated in said shell, the upper end of said tube being secured to said top and the lower end of said tube being secured to said bottom; and an immersion electric heater inserted in the bottom said tube.

4. In an electric water heater, the combination of: a cylindrical outer shell; a top secured in said shell; a bottom secured in said shell; a tube situated in said shell, the upper end of said tube being secured to said top and the lower end of said tube being secured to said bottom; and an immersion electric heater inserted in the bottom of said tube, said tube being perforated at a point near said immersion heater to allow cold water to pass through said tube and impinge against said heater, and at a point near the top of said tube to allow the heated water to pass out of said tube.

In testimony whereof, we have hereunto set our hands and seals at Los Angeles, California, this 21st day of February, 1922.

WILLIAM G. CARTTER.
FULLER W. THOMPSON.